United States Patent
Barthel et al.

(10) Patent No.: US 7,837,453 B2
(45) Date of Patent: Nov. 23, 2010

(54) DEVICE FOR DRIVING AN OIL PUMP IN A TRANSMISSION

(75) Inventors: Lothar Barthel, Meckenbeuren (DE); Tobias Karstens, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 816 days.

(21) Appl. No.: 11/803,543

(22) Filed: May 15, 2007

(65) Prior Publication Data
US 2007/0286757 A1 Dec. 13, 2007

(30) Foreign Application Priority Data
Jun. 8, 2006 (DE) .................. 10 2006 026 631

(51) Int. Cl.
F04C 2/10 (2006.01)
F04C 15/00 (2006.01)
F16H 47/08 (2006.01)

(52) U.S. Cl. .................... 418/61.3; 74/606 R
(58) Field of Classification Search ............... 418/61.3, 418/169, 170; 74/606 R
See application file for complete search history.

(56) References Cited

U.S. PATENT DOCUMENTS

| 2,587,838 | A | * | 3/1952 | Green | 403/359.1 |
| 3,550,724 | A | | 12/1970 | Vollmer | |
| 3,990,550 | A | * | 11/1976 | Recker | 192/46 |
| 4,473,359 | A | * | 9/1984 | Davis | 464/88 |
| 4,738,152 | A | | 4/1988 | Takimura et al. | |
| 4,841,803 | A | | 6/1989 | Hamano et al. | |
| 4,922,765 | A | | 5/1990 | Hayakawa et al. | |
| 5,092,736 | A | * | 3/1992 | Herlitzek | 418/171 |
| 5,333,963 | A | * | 8/1994 | Blumentrath | 403/301 |
| 5,467,668 | A | * | 11/1995 | Kameda et al. | 74/606 R |
| 5,716,156 | A | * | 2/1998 | Bayer et al. | 403/282 |

FOREIGN PATENT DOCUMENTS

| DE | 1 971 856 | 11/1967 |
| DE | 1 959 585 | 11/1970 |
| DE | 202 12 093 U1 | 11/2002 |
| DE | 102 27 314 A1 | 1/2004 |
| DE | 103 57 447 A1 | 10/2004 |
| FR | 2 866 685 | 8/2005 |

OTHER PUBLICATIONS

Henning and Magnussen, "Six-gear automatic transmission and all-wheel drive", *ATZ*, Special Edition VW Phaeton, Jul. 2002, pp. 60-66.

* cited by examiner

*Primary Examiner*—Thomas E Denion
*Assistant Examiner*—Mary A Davis
(74) *Attorney, Agent, or Firm*—Davis & Bujold, P.L.L.C.

(57) ABSTRACT

A device (1) for driving an oil pump (2) for a transmission of a motor vehicle, having a pump housing (4), a transmission housing (3), a pump shaft (8), and a gear shaft (13), which is in rotationally fixed connection with the pump shaft (8). The gear shaft has a gear wheel (14) and is mounted in the transmission housing as part of a gear stage. It is proposed that the gear shaft (13) is bearing-mounted on both sides of the gear wheel.

7 Claims, 1 Drawing Sheet

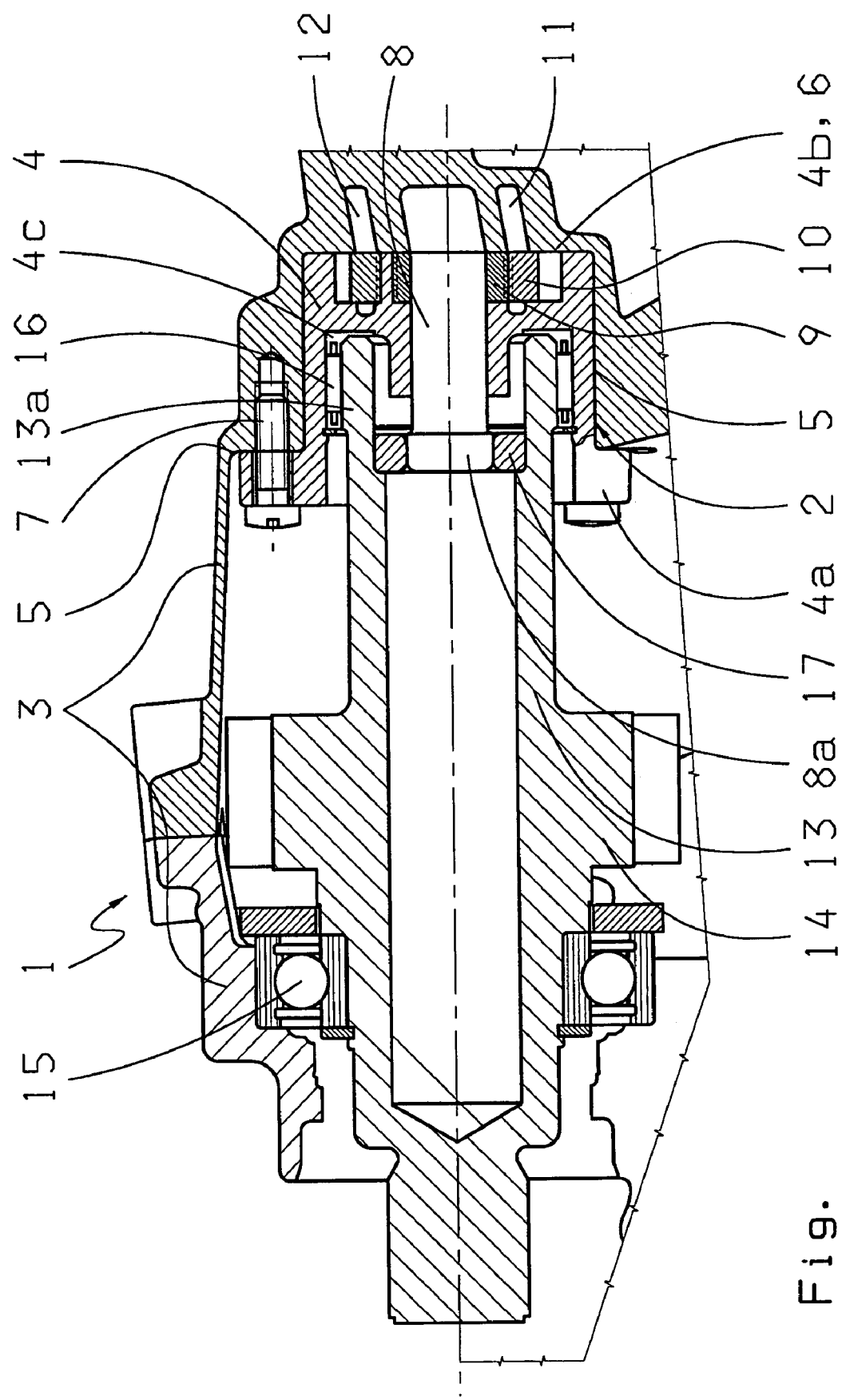

DEVICE FOR DRIVING AN OIL PUMP IN A TRANSMISSION

This application claims priority from German Application Serial No. DE 10 2006 026 631.5 filed Jun. 8, 2006.

FIELD OF THE INVENTION

The invention concerns a device for driving an oil pump for a transmission of a motor vehicle.

BACKGROUND OF THE INVENTION

Motor vehicle transmissions, especially automatic transmissions, need at least one oil pump to deliver and build up the pressure of oil (ATF) in an oil circuit for the lubrication of gears and bearings, for the actuation of shift elements and/or for cooling the transmission. As main or primary pumps for the supply of oil to an automatic transmission, engine-driven, gear-type pumps or radial piston pumps are known. From DE 102 27 314 A1 by the Applicant, a so-termed converter neck pump is known, which is made as an internally geared pump (crescent moon pump) and is driven by the converter neck of the torque converter. In addition to such main pumps, secondary pumps are also used for automatic transmissions, and perform further oil supply functions instead of or in addition to the main pump. This may be the case, for example in vehicle with all-wheel or front-wheel drive as known from DE 202 12 093 U1 by the Applicant. In that case, in addition to the central transmission an auxiliary transmission which distributes an input torque from the central transmission to the front and rear axles has to be supplied with oil. In the publication "Six-gear automatic transmission and all-wheel drive" by Henning and Magnussen in ATZ, July 2002, Special Edition VW Phaeton, pp. 60 to 66, a secondary oil pump of this type for an auxiliary transmission id disclosed. The oil pump is an internally geared pump, has a pump housing bolted onto a transmission housing and is driven by a so-termed cross-shaft of the transmission. The cross shaft itself is driven by a gear, spur gear or so-termed beveloid gearing stage. This the spur gear is overhang-mounted on the cross shaft. For optimum meshing of the gear stage such overhang mounting is unsuitable, inasmuch as bending deflection and tilting at the gear meshing point can have negative results in relation to gear noise and lifetime. Moreover, it is also a disadvantage that because of the bending of the spur gear shaft (cross shaft) relatively large play is needed in the drive connection between the spur gear shaft and the pump drive shaft, which results in a corresponding increase in noise and a more rapid wear.

Starting from the above prior art, the purpose of the present invention is to provide for a device of the type mentioned above with an improved pump drive system, which operates with little generated noise and which has a longer life.

SUMMARY OF THE INVENTION

The invention provides that the gear shaft has a mounting on both sides of the gear wheel, which meshes with another gear wheel. This is advantageous because the bending deflection of the gear shaft is smaller, which results in better gear meshing; a drive connection with less play, and less generated noise.

The first bearing of the gear shaft, preferably a roller bearing, is supported in the transmission housing, while the second gear shaft bearing is arranged in the pump housing which has a corresponding bearing bore to receive the bearing. The pump housing itself is preferably cylindrical and is fitted into a corresponding bore in the transmission housing so that the forces resulting from the second bearing are transferred indirectly to the transmission housing. This gives the advantage of a stable, rigid and bend-resistant mounting by which the gear shaft is centered and a saving of axial structural space. A further contribution to the latter is that in the area of the pump housing, the gear shaft is hollow to accommodate within itself a part of the pump drive shaft, in particular the drive connection between the gear shaft and the pump shaft.

The drive connection between the gear shaft and the pump shaft can be formed with positive locking or by friction force locking: preferably, a carrier ring with a carrier profile is pressed into the end of the hollow shaft and engages with the pump shaft with positive locking. Thanks to the mounting of the front end of the gear shaft according to the invention, the drive connection between the gear shaft and the pump shaft can be made within a fine tolerance, i.e., it can be made with very little radial play. The advantages of this are quiet running and longer life.

According to a preferred embodiment, the pump housing accommodates within itself, the pump shaft, pump rotors—for example an inner gear which meshes with an outer gear, and corresponding suction chambers. The pump housing is open at the end and its end face is in contact with a flat surface on the transmission in which the pressure and suction chamber of the pump are formed. The pump housing is sealed at the end, relative to the transmission housing, by fixing the pump housing firmly against the transmission housing. For that purpose, the pump housing has a corresponding flange which is bolted onto the transmission housing, leaving an axial gap. This ensures a defined contact pressure between the end face of the pump housing and the flat surface on the transmission housing.

The pump housing, with its individual components, preferably can be made as a pre-assembled structure, which can even undergo functional testing separately (before being fitted).

Preferably the oil pump is made as a gear-type pump, in particular an internally geared pump, but other structural forms, known from the prior art, are possible.

BRIEF DESCRIPTION OF THE DRAWINGS

The invention will now be described, by way of example, with reference to the accompanying drawings in which:

FIG. 1 is a sectional view of a device for driving an oil pump.

DETAILED DESCRIPTION OF THE INVENTION

FIG. 1 shows a sectioned view of a device 1 for driving an oil pump 2 which is arranged in a transmission housing 3 of a motor vehicle (not shown). The oil pump 2 has a pump housing 4 of cylindrical outer shape which is fitted into a cylindrical bore 5 in the transmission housing 3. The pump housing 4 has a flange 4a and an end face 4b, which is in contact with a corresponding flat surface 6 on the transmission housing 3. The pump housing 4 is fixed firmly against the transmission housing 3 by way of fixing bolts 7 in such a manner that the end face 4b is supported against the flat surface 6 of the transmission housing—leaving for this a corresponding gap S between the flange 4a and the transmission housing 3. The pump housing 4 holds a pump shaft 8 that drives an inner rotor 9 which meshes with an outer rotor 10, for example in the manner of an internally geared or a crescent moon pump. A suction chamber 11 and a pressure chamber 12 are arranged in the transmission housing 3. The suction and pressure chambers 11, 12 are connected, via corresponding ducts, to an oil circuit (not shown), preferably for the supply of an auxiliary transmission (not shown) of the motor vehicle.

In the transmission housing 3, a gear shaft 13 is arranged in rotationally fixed connection with a gear wheel 14 which, for its part, meshes with a further gear (not shown) of a gear stage. The gear shaft 13 is part of a cross-shaft (corresponding to the prior art mentioned earlier) which is not shown in full, the cross shaft being driven by the gear wheel 14 of the gear stage and, in its turn, driving the front axle (not shown) of the motor vehicle. On one side the gear shaft 13 is mounted by way of a first bearing 15 in the transmission housing 3 and, on the other side, by way of a second bearing 16 in the pump housing 4. The first bearing 15 is preferably in the form of a bal-race bearing (fixed bearing) and the second bearing 16 in the form of a roller pin bearing (loose bearing). The pump housing 4 has a bearing bore 4c within which the pin bearing 16 and the front end 13a of the gear shaft 13 made as a hollow shaft are held. By virtue of this arrangement, the dial bearing forces of the second bearing 16 are transferred, via the pump housing 4, directly into the transmission housing 3. At the same time, the gear shaft 13 is centered relative to the transmission housing 3. Into the front end 13a of the gear shaft 13, a carrier ring 17 is pressed, which is thus in rotationally fixed connection with the gear shaft 13. On its inside circumference, a carrier ring 17 has a carrier profile (not shown) which engages with a corresponding carrier profile on the end 8a of the pump shaft 8 and so forms a torque-transmitting connection between the gear shaft 13 and the pump shaft 8. The carrier profile can be a polygonal or toothed profile, or some other positive-locking and torque-transmitting connection. Alternatively, the drive from the gear shaft 13 to the pump shaft 8 can also be transmitted by friction.

The device 1, described above, is preferably used for supplying oil to an auxiliary transmission (not shown) of an all-wheel-drive motor vehicle, i.e., it functions as a secondary pump in addition to a main pump (not shown) for a central transmission of the motor vehicle. In this case the secondary pump is driven by the cross shaft which, in turn, is driven by the central transmission, via a spur gear stage. Thanks to the mounting of the gear shaft 13 at both ends in accordance with the invention, i.e., on both sides of the meshing gear wheel 14, the mounting is rigid, with improved meshing, quiet running, and a longer life. Due to the axial overlap between the pump housing 4 with its bore 4c and the end of the hollow shaft 13a, the axial structural space occupied is shorter. Moreover, the carrier profile supported by the bearing 16, is not affected by any shaft bending or tilting between the carrier ring 17 and the pump shaft 8, 8a and can, therefore, be made to a close tolerance, which also leads to quiet running and longer life.

The oil pump 2 is preferably made as a pre-assembled structure which can even be tested for functionality separately—before it is fitted into the transmission housing 3. Otherwise than in the example embodiment illustrated, the pressure chambers could also be located in the pump housing or parts of the pump, for example the rotors, could be arranged in the transmission housing.

REFERENCE NUMERALS 1 device
2 oil pump
3 transmission housing
4 pump
4a flange
4b end face
4c bearing bore
5 transmission bore
6 flat surface
7 fixing bolts
8 pump shaft
8a end of the pump shaft 8
9 inner rotor
10 outer rotor
11 suction chamber
12 pressure chamber
13 gear shaft
13a front end of the gear shaft 13; hollow shaft
14 gear wheel
15 first bearing
16 second bearing
17 carrier ring
S gap

The invention claimed is:

1. A device (1) for driving an oil pump (2) of a transmission of a motor vehicle, the device comprising:
   a transmission housing (3);
   a pump housing (4);
   a pump shaft (8); and
   a gear shaft (13) with a gear wheel (14), the gear shaft (13) being fixedly connected with the pump shaft (8) and being supported within the transmission housing (3) as part of a gear stage, and the gear shaft (13) being rotationally supported by bearings located on opposite sides of the gear wheel (14),
   wherein the pump housing (4) is supported in the transmission housing (3),
   the gear shaft (13) is supported by a first bearing (15) which is supported by the transmission housing (3),
   the gear shaft (13) is supported by a second bearing (16) which is supported by the pump housing (4),
   a pump side of the gear shaft (13) is a hollow shaft (13a) and the pump shaft (8) extends inside the hollow shaft (13a) of the gear shaft (13),
   the pump housing (4) has a bearing bore (4c) and the hollow shaft (13a) of the gear shaft (13) is supported within the bearing bore (4c),
   the pump shaft (8, 8a) is coupled to the hollow shaft (13a) by one of positive locking and friction force locking,
   wherein the pump housing (4) has an open circular end face (4b) which communicates with and is sealed against a flat surface (6) of the transmission housing (3), and
   the oil pump (2) includes a pump rotor (9,10) located in the pump housing and driven by the pump shaft (8, 8a) and communicating with a suction chamber (11) and a pressure chamber (12) located within the transmission housing (3) through the open circular end face (4b) of the pump housing (4).

2. The device according to claim 1, wherein the gear shaft (13, 13a) is rotationally supported within the bearing bore (4c) by a roller pin bearing (16).

3. The device according to claim 1, wherein the pump housing (4) is cylindrical and is supported within a cylindrical bore (5) of the transmission housing (3).

4. The device according to claim 3, wherein the pump housing (4) has a flange (4a) by way of which the pump housing (4) is fixed to the transmission housing (3).

5. The device according to claim 1, wherein the oil pump (2) is pre-assembled and tested prior to use.

6. The device according to claim 1, wherein the pump shaft (8, 8a) is coupled to the hollow shaft (13a) by a carrier ring (17) located in the hollow shaft (13a) and engaging the gear shaft (13) and the pump shaft (8, 8a) by one of positive locking and friction force locking.

7. A device (1) for driving an oil pump (2) of a transmission of a motor vehicle, the device (1) comprising:
- a transmission housing (3);
- a cylindrical pump housing (4) has a flange (4a), the flange (4a) is fixed to the transmission housing (3) by a bolt (7) to secure the pump housing (4) within a cylindrical bore (5) of the transmission housing (3);
- a gear shaft (13) having a gear wheel (14) axially located on the gear shaft (13) between a hollow portion (13a) and an opposed second end; the hollow portion (13a) of the gear shaft being rotationally supported by a first bearing (16) which is supported by the pump housing (4), the opposed second end of the gear shaft (13) is rotationally supported by a second bearing supported by the transmission housing (3);
- a pump shaft (8) being supported by a carrier ring (17) within the hollow portion (13a) of the gear shaft (13) such that the pump shaft (8) positivety engages the gear shaft (13) in a rotationally fixed manner; and
- an inner rotor (9) located in the cylindrical pump housing (4) communicates with and is rotationally driven by the pump shaft (8), and communicates with a suction chamber (11) and a pressure chamber (12) located in the transmission housing (3) to displace lubrication.

\* \* \* \* \*